United States Patent

Ostergren et al.

[15] 3,654,749

[45] Apr. 11, 1972

[54] MOWER MOUNTING LINKAGE

[72] Inventors: William F. Ostergren, Terre Hill; Joseph C. Hurlburt, Leola, both of Pa.

[73] Assignee: Sperry Rand Corporation, New Holland, Pa.

[22] Filed: Oct. 5, 1970

[21] Appl. No.: 77,954

[52] U.S. Cl. ........................................56/15.8, 56/DIG. 22
[51] Int. Cl. ....................................................A01d 35/26
[58] Field of Search............................56/15.8, 16.3, DIG. 22

[56] References Cited

UNITED STATES PATENTS 3,283,486   11/1966   Marek et al...........................56/16.3
3,483,684   12/1969   Price..................................56/DIG. 22
3,461,654   8/1969    Plamper..............................56/DIG. 22

Primary Examiner—Antonio F. Guida
Attorney—Joseph A. Brown, John C. Thompson, James J. Kennedy and George C. Bower

[57] ABSTRACT

A linkage arrangement for mounting a rotary mower unit beneath the chassis of a tractor, between the front and rear wheels. The linkage arrangement includes draft and lift linkages, the draft linkage principally functioning to tow the mower unit while the lift linkage functions to move and guide the mower unit upwardly and downwardly, normally in a plane approximately parallel to the chassis.

14 Claims, 5 Drawing Figures

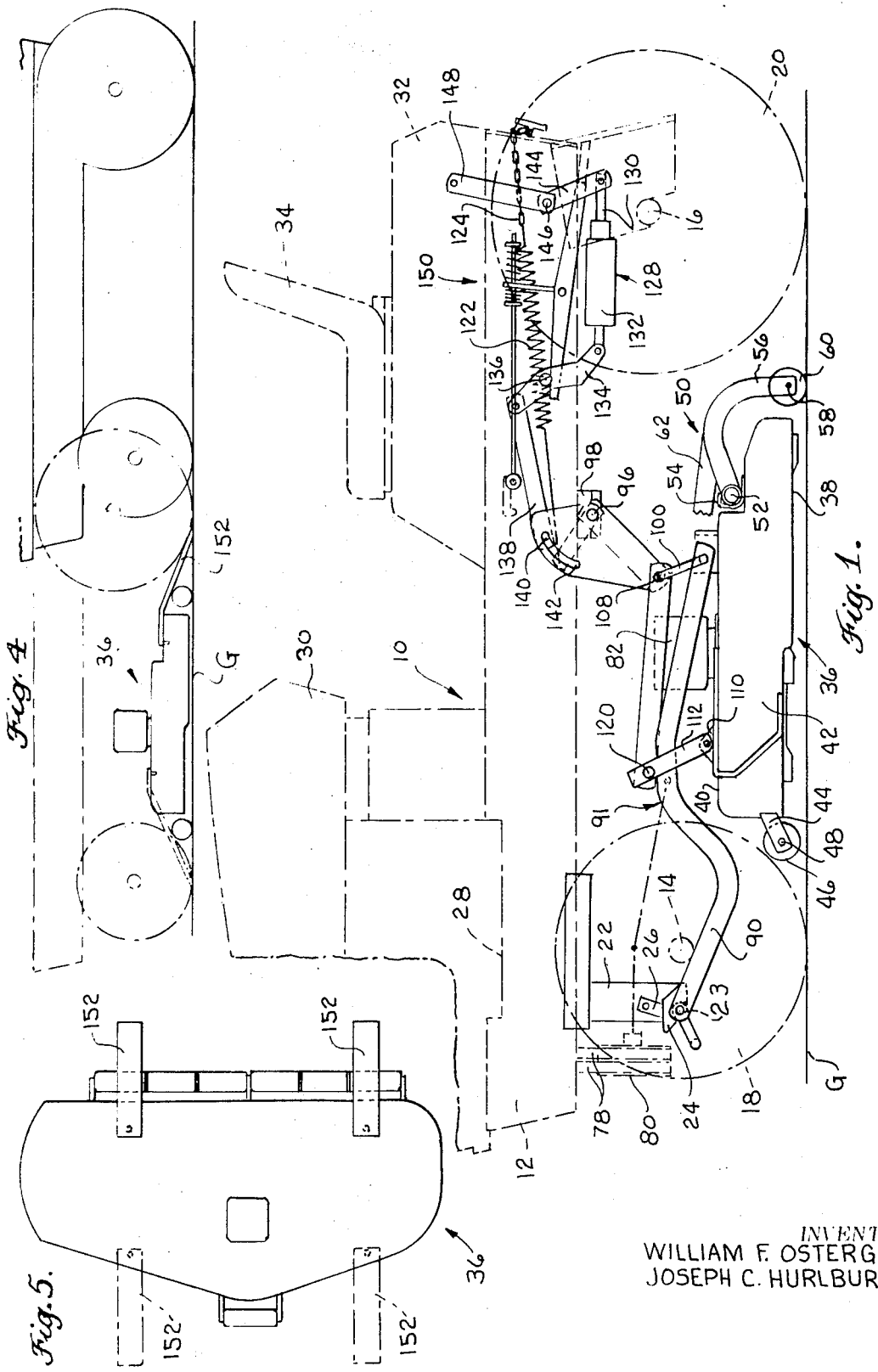

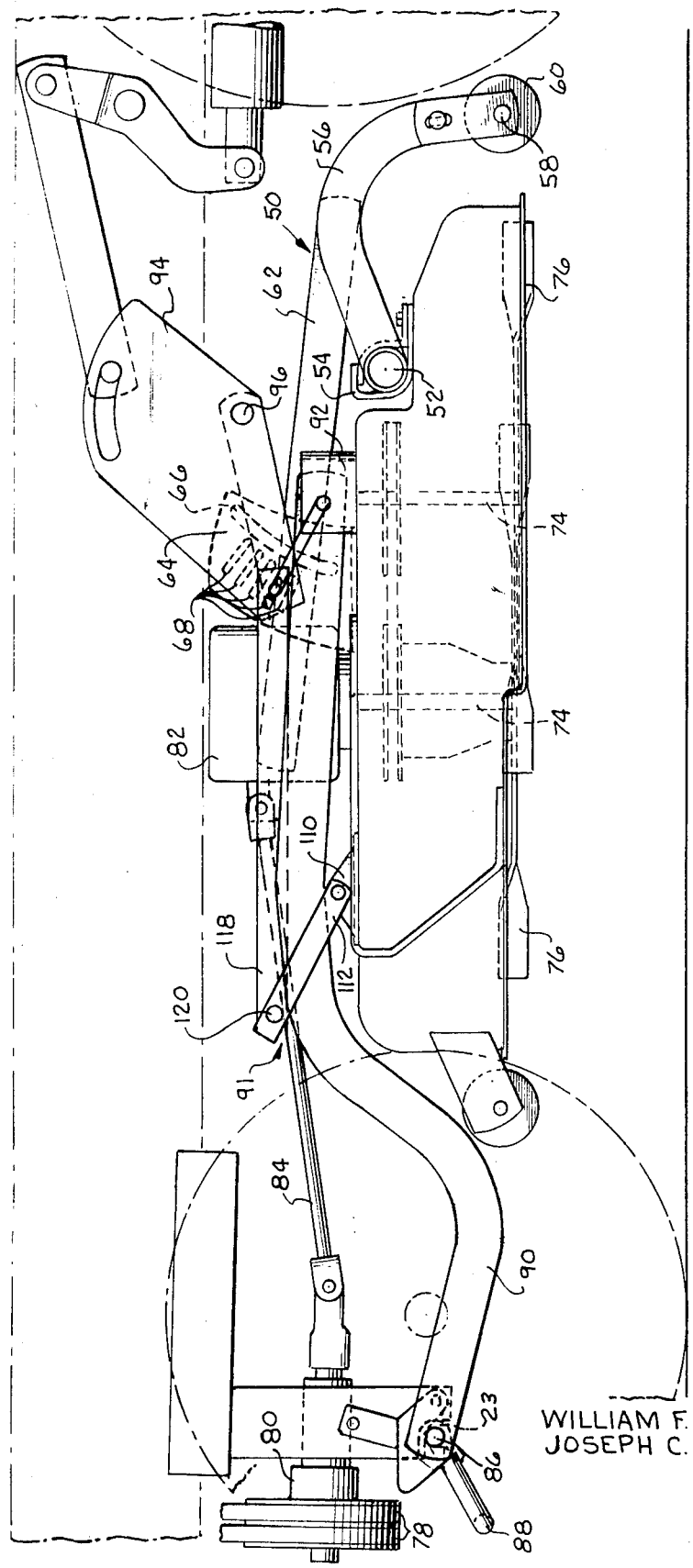

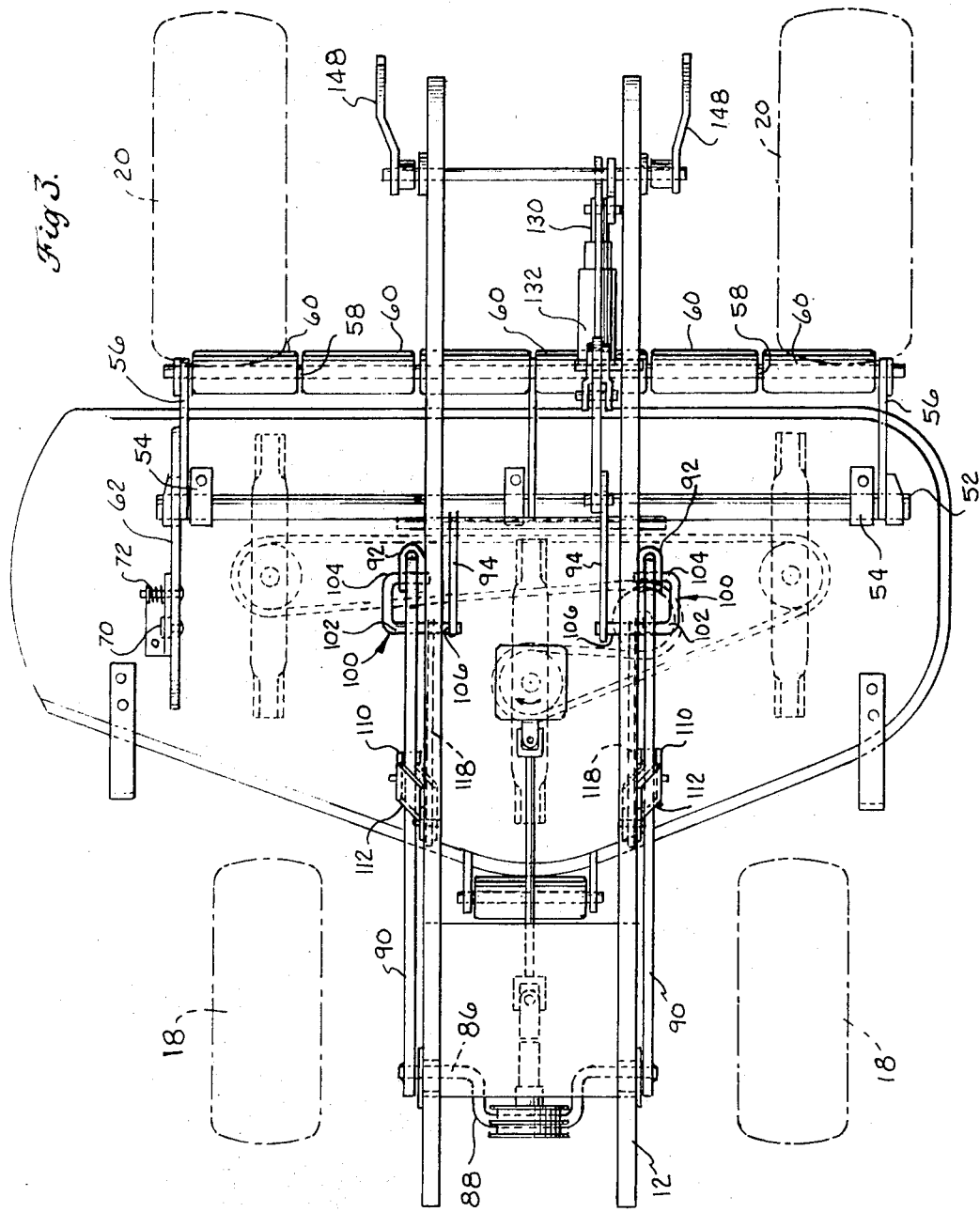

MOWER MOUNTING LINKAGE

BACKGROUND OF INVENTION

In the past various forms and types of linkage arrangements have been utilized in suspending rotary mower units beneath the chassis of a tractor. However, many of these linkages have proven to be inadequate and undersirable in numerous respects. First and perhaps foremost in the minds of the consumer is the effort and inconvenience commonly associated with positioning mower units beneath the chassis and attaching the linkage to the mounting means of the tractor. Often the linkages require hitching at multiple points, and in some cases the hitching operation requires the use of tools. Another common characteristic of past mower suspension systems has been the rigidity and lack of adequate sensitivity and floatation capacity of the linkages. Without proper floatation one can expect uneven cutting, scalping, and damage to the mower housing, resulting from impact with foreign objects along the path of travel.

It is therefore the primary object of the present invention to overcome the disadvantages of the prior art.

Another object of the present invention is to provide a rotary mower unit with a novel dual suspension linkage, said dual linkage comprising a draft linkage for towing the mower and a lift linkage for lifting the mower and guiding the same during floatation, said linkages being designed to function principally independently of each other.

A further object of the present invention is to provide a rotary mower having front and rear ground engaging rollers with a unique linkage arrangement that enables the front roller to move over undulations independently of the rear rollers while the linkage normally maintains the mower unit in a plane approximately parallel to the tractor chassis in response to the movement of the rear ground engaging roller over ground undulations.

Another object of the present invention is to provide a flexible linkage structure whereby the mower unit may float a significant degree laterally.

Another object of the present invention is to provide a tension spring operatively connected between the mower unit and the tractor chassis for biasing said mower unit upwardly, the tension of said spring being adjustable for varying the floatation sensitivity of the mower unit.

A further object of the present invention is to provide ram means that are detachably mounted to the mower unit for driving the tractor thereacross, thereby positioning the tractor about the mower unit for mounting.

Another object of the present invention is to provide a relatively flat linkage that when disconnected lies forwardly and closely adjacent the top of the mower housing, thereby enabling the tractor to drive thereover without disturbing the linkage.

An additional object of the present invention is to provide a linkage with an effective two point hitch, said hitching points being about two transverse axes longitudinally spaced apart.

Another object of the present invention is to provide the linkage with simple hitching means that may be readily manipulated by hand without the need of tools.

Other objects and advantages of the present invention will become apparent and obvious from a study of the following description and the accompanying drawings which are merely illustrative of the present invention.

DESCRIPTION OF THE DRAWINGS

FIG. 1 is a more or less diagrammatic side elevational view of a lawn and garden tractor, shown in phantom, with a rotary mower unit suspended therefrom in the operative mode by the linkage of the present invention.

FIG. 2 is a somewhat enlarged side elevational view showing the mower unit suspended in the non-operative mode from the tractor chassis.

FIG. 3 is a plan view of FIG. 2 on a somewhat reduced scale.

FIG. 4 is a diagrammatic elevational view illustrating the ramp means for positioning the tractor over the mower unit.

FIG. 5 is a diagrammatic plan view of the mower unit and ramp means.

With further reference to the drawings in detail, particularly FIG. 1, a lawn and garden tractor designated by the numeral 10 is shown in phantom. The tractor 10 is comprised of a chassis 12 in which front and rear axles 14, 16 are secured transversely thereunder. Rotatively mounted to opposite ends of the front and rear axles 14, 16, are front wheels 18 and rear wheels 20 respectively. Secured across the underside of the front end of the chassis 12 and depending downwardly therefrom adjacent the front axle 14 is a front mounting block 22. Formed along the lower edge of the front mounting block 22 are semi-circular curls 23 whose openings face forwardly for receiving a cross bar of the draft linkage which will be described later in detail. Pivotally secured to the opposite ends of the front mounting block 22 is a latch 24 and associated lock plate 26 for firmly securing the above mentioned cross bar within the curls 23. Provided about the front top side of the chassis is an engine cavity 28 for supporting the power source, not shown, therein. A hood 30 extends lengthwise over the engine cavity 28 tending to drap over and house the top of the power source, not shown. Referring to the rear of the tractor 10, a rear deck 32 is situated atop the chassis 12 and has an operator's seat 34 mounted thereto.

Tractively coupled beneath the chassis 12 of the tractor 10 is a mower unit indicated generally at 36. The mower unit 36 includes a housing 38 having a top portion 40 with peripheral walls 42 depending therefrom. Extending forwardly and downwardly from the front wall of the mower housing 38 is a pair of laterally spaced apart parallel arms 44. Rotatably mounted transversely between the arms 44 is a front ground engaging roller 46 disposed about a front axle 48. As seen in FIG. 1, which shows the mower unit 36 in the operative mode, the front roller 46 is spaced slightly above ground level G. In the course of mowing, the front roller 46 tends to ride over sharp hilly terrain and foreign objects lying in the path of travel, thereby avoiding damage to the mower unit 36 which often results from such conditions.

Turning to FIGS. 2 and 3, a height control device for adjusting the mower housing 38 for different cutting heights is indicated generally by numeral 50 and is disposed across the rear of the mower unit 36. The height control 50 comprises a rockshaft 52 that extends transversely the rear of the mower housing 38 and is secured thereacross by clips 54. Fixedly mounted to opposite ends of the rockshafts 28 are a pair of like curved arms 56 which extend rearwardly and downwardly behind the mower housing 38. Secured between the rear ends of the curved arms 56 is a rear axle 58 having a series of ground engaging rollers 60 rotatively disposed end-to-end therearound. A control handle 62 extends from either of the curved arms 56 for pivoting the ground engaging rollers 60 about the axis of rockshaft 52. The upper end portion of control handle 62 extends adjacent a quadrant 64 which is mounted atop the mower housing 38 (FIG. 2). The quadrant 64 includes a guiding arc 66 and a series of spaced apart stationing slots 68 disposed adjacent thereto. Fixed to the control handle 62 next to the quadrant 64, in a locking block 70 (FIG. 3) which is receivable within the stationing slots 68 for positioning the control handle in a plurality of positions. As seen in FIG. 3, a spring loaded bolt assembly 72 extends from the control handle 62 through the guiding arc 66, tending to bias the control handle and the quadrant 64 toward each other. This enables the control handle 62 to be readily moved from one position to another while assuring that the locking block 70 is not jarred from the selected stationary slot 68 during mowing.

Suitably journalled within the top of housing and depending downwardly therefrom for rotation about vertical axes are a series of drive shafts 74. Cutting elements or blades 76 are horizontally disposed about the lower ends of the shafts 74 for rotation therewith. Power for driving the shafts 74 and consequently the blades 76 is provided by the power source of the tractor, not shown. As seen in FIG. 2, power is transferred from the power source by belts 78 to a pulley 80 mounted beneath the forward portion of the chassis 12. The rotative motion of the pulley 80 is transmitted to a gearbox 82 by a universal shaft 84 where the vertical rotative motion of the pulley is transformed to horizontal rotative motion. This horizontal rotative motion is conveyed to the shafts 74 by a series of pulleys and belts, shown in dotted lines in FIG. 3, located beneath the top of the mower housing 14.

The mower unit 36 is suspended from beneath the tractor chassis 12 by a combination draft and lift linkage. With particular reference to FIGS. 2 and 3, the draft linkage includes a cross rod 86 which is rotatarily received within the semi-circular curls 23 formed beneath the front mounting block 22. An intermediate portion of the cross rod 86 is bowed forwardly to form a generally U-shaped handle 88. Fixed to opposite ends of the cross bar 86 is a pair of like draft links 90 which extend rearwardly therefrom in lateral spaced apart relationship. More particularly, the links 90 extend slightly downwardly from the front mounting block 22, then curve upwardly over the front of the mower housing 38 and extend to a rear pair of mower mounting brackets 92 where the rear ends of the links 90 are pivotally secured.

The portion of the links 90 that curve upwardly over the front of the mower housing is indicated generally at 91 and will be referred to as an upper curvature for explanation purposes. Detail consideration of the relevancy of the upper curvature 91 will be deferred for now, but will be discussed later in conjunction with the lift linkage.

The lift linkage is comprised of a pair of lift arms 94 fixed to opposite ends of a transversely extending rockshaft 96 which is rotatively journalled within mounting brackets 98, the mounting brackets being fixed to the underside of the tractor chassis 12. Connecting the rear portion of the mower 36 with the lift arms 94 is a pair of generally U-shaped intermediate lift links 100. As best seen in FIG. 3, each of the U-shaped lift links 100 includes a base 102, a lower leg 104, and an upper leg 106. Upper legs 106 are receivable within an elongated opening 108 (FIG. 1) disposed in the lower ends of the lift arms 94 and confined therein by pin means, not shown. Lower legs 104 are pivotally secured within the rear mower mounting brackets 92 and are slideable laterally back and forth therein for connecting and disconnecting the upper legs 106 with the lift arms 94. Fixed to the front portion of the mower housing 38 are a pair of front mounting brackets 110, each of which is longitudinally aligned with one of the rear mounting brackets 92. Pivotally attached to each of the front mower brackets 110 is a pair of inverted vee shaped front support links 112. Each of the vee-shaped support links 112 have a pair of legs which extend upwardly adjacent the outer and inner sides of each of the draft links 90 to form a vertex thereover. Connected between the vertex of the front support links 112 and the upper leg 106 of the U-shaped intermediate links 100 is a pair of guide links 118. The front portion of the guide link 118 is pivotally attached to the vertex of the vee links 112 by pivot pins 120 while the rear ends are disposed about the upper legs 106 of the U-shaped intermediate links 100, outwardly of the lift arms 94. Rotatively secured about the pivot pins 120 between the legs of the vee support links 112 is a roller, not shown. Each of the rollers normally ride adjacent the upper curvature portion 91 of the links 90 for supporting the front portion of the mower 36 and are induced back and forth along the curvature by the movement of guide links 118. The upper curvature portion 91 is precisely curved relative to the geometry of the lift linkage to maintain the mower unit 36 in a plane approximately parallel to the chassis 12. Expounding on the latter point more thoroughly, as the mower unit 36 floats up and down over undulations in the ground the U-shaped links 100 and the lift links 94 will rotate about the axis of lower leg 104 and rockshaft 96 respectively. As the U-shaped links 100 and the lift links 94 rotate, the guide links 118 are actuated back and forth, moving the vee links 112 along the upper curvature 91 in the process. For a given displacement of the rear portion of the mower unit 26, the U-links 100 and lift links 94 respond by moving the vee links 112 a distance along the curvature 91. The curvature 91 is so curved that the movement of the vee links 112 thereover displaces the front portion of the mower unit a distance approximately equal to the given displacement of the rear portion of the mower. Thus the movement of the vee links 112 along the upper curvature 91 maintains the entire mower unit in a plane approximately parallel to the chassis 12.

The mower unit 36 is biased upwardly by a coil spring 122 (FIG. 1). A front portion of the coil spring 122 is attached to either of the lift arms 94 and the rear portion includes an integral link chain section 124 having a handle 126 fixed to the rear extremity thereof. The chain section 124 extends through a keyhole type opening, not shown, within the rear end of the tractor chassis 12. By fastening the chain at various intervals within the keyhole, the tension of the spring 122 and consequently the floatation sensitivity of the mower unit 36 may be selectively varied.

The power means for selectively actuating the lift linkage is the subject matter of a concurrently filed application, but for the sake of understanding the unified operation of the mower linkage a brief description is provided. Accordingly, the power source is a longitudinal extending double acting hydraulic cylinder 128 having a piston portion 130 slideable contained with a housing portion 132. The housing portion 132 is linked with a front connecting arm 134 which is pivotable back and forth about an axis 136. Fixed to the upper end of the front connecting arm 136 and extending forwardly therefrom is a finger 138 having a stub shaft 140 about the forward end thereof slideably contained within a lost motion slot 142 of either of the lift arms 94. The piston portion 130 of the cylinder 128 is linked to a rear connecting arm 144 which is fixed to a rear-transversely extending rockshaft 146. Fixed to opposite ends of the rear rockshaft 146 is a pair of rear lift arms 148 for carrying or pulling a rear mounted implement, not shown. In order that the cylinder 128 may actuate the center rockshaft 96 and the rear rockshaft 146 independently of each other, a lockout mechanism indicated generally at 150 is provided. FIG. 1 shows the lockout mechanism 150 positioned such that the piston portion 130 of the cylinder 128 is anchored, thereby enabling the housing portion 132 to actuate the lift linkage of the mower by pivoting the center rockshaft 96. Specifics of the lockout mechanism 150 is not discussed herein since it is deemed an intergral part of the power means which, as mentioned above, is the subject matter of a separate invention described and claimed in a concurrently filed application.

With reference to FIGS. 4 and 5, detachable ramp means 152 are shown mounted to either the front or rear portions of the mower housing 38. To position the mower unit beneath the chassis 12, intermediately between the front and rear wheels, the ramp means are attached to the rear of the mower housing 38. Then the front wheels of the tractor 10 are driven up the ramp means 152, across and down the front of the housing. To attach the linkage the handle portion 88 of the cross bar 86 is grasped and positioned within the semi-circular curls 23 formed beneath the front mounting block 22. The latch 24 and the lock plate 26 is then fastened about the cross bar 86 to secure it within the curls. In attaching the lift linkage the U-links are moved inwardly inserting the upper legs 106 within the openings 108 of the lift arms 94 and confining them therein by placing pins, not shown, in the inward ends thereof.

FIG. 1 shows the mower unit 36 in the operative mode. Note that as the mower travels over generally level terrain the front roller 46 is positioned slightly above ground level while the rear roller 60 normally engages the ground. As the rear ground engaging roller 60 negotiates undulations in the ground level the lift linkage is designed to maintain the mower unit in a plane approximately parallel to the tractor chassis 12. For example, as the rear roller 60 moves over a rise in the terrain, the spring 122 tends to bias the mower unit upwardly, pivoting the lift arms 94 forwardly and upwardly. As the lift arms 94 pivot forwardly and upwardly, the U-shaped intermediate links 100 also pivot generally forwardly about the axis of the lower legs 104 thereof, driving the guiding links 118 in a forward direction. The forward movement of the guiding links 118 compels the inverted vee links 112 to move forwardly along the upper curvature 91 of the draft links 90, thereby lifting the front of the mower housing 38 such that the entire mower unit is maintained in a plane approximately parallel to the tractor chassis 12. Likewise, when the rear roller 60 dips downwardly in a depression within the ground, the guiding links 118 are driven rearwardly which moves the vee links 112 rearwardly along the curvature of the draft links 90.

However the same linkage will permit the front roller 46 to move upwardly or downwardly independently of the rear ground engaging roller 60. For example, as the front of the mower housing 38 approaches a sharp appreciable rise in the terrain the front roller 46 will ride thereover, urging the vee links 112 and guiding links 118 upwardly. As guiding links 118 pivot upwardly about the axis of the upper legs 106 there is little, if any, effect on the lift arms 94 or the U-links 100. Thus it follows that the position of the rear roller 60 is relatively independent of the position of the front roller 46. This particular feature makes the mower unit less susceptible to damages resulting from impacts with mounds and other obstacles such as foreign objects lying in the path of the mower.

Also it should be pointed out that the entire linkage gives the mower unit a significant lateral floatation capability. As rises or undulations approach one side of the mower, the elongated, slender draft links 90 flex as the upper legs 106 of the U-links are free to move within specially provided oval shaped openings 108 of the lift links 94.

The terms, "upper," "lower," "forward," "rearward," etc., have been used herein merely for the convenience of the foregoing specification and in the appended claims to describe the mower linkage and its parts as orientated in the drawings. It is to be understood however, that these terms are in no way limiting to the invention since the linkage may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described the invention, what is claimed is:

1. A linkage for tractively coupling a mower unit to a tractor chassis, comprising in combination; a tractor having a maneuverable chassis for movement over the ground, a mower unit adapted to be linked to said chassis and including ground engaging means extending transversely and generally to the rear thereof; front and rear mounting means fixed to said mower unit; a pair of draft links pivotally secured at the front ends about an axis extending transversely of said chassis and extending rearwardly therefrom over said mower unit where the rear ends are pivotally secured within said rear mower mounting means, each of said draft links including a curvature portion selectively curved over said mower unit; a pair of support links, each slideably mounted and normally supported along said curvature portion and depending downwardly therefrom where lower ends thereof are pivotally secured within said front mower mounting means; and linkage means moveably responsive to the movement of the ground engaging means of said mower unit over undulations in the ground and operatively connected to said slideable support links for moving the latter along said curvature portion in response to the undulating movement of the ground engaging means, said curvature portion being selectively curved such that the mower unit is maintained in a plane approximately parallel to said chassis by the movement of said slideable support links by said moveable linkage means.

2. The combination as set forth in claim 1 wherein said mower unit further includes moveable lift linkage means interconnected between said chassis and said rear mower mounting means and wherein said linkage means moveably responsive to the movement of the ground engaging means is comprised of guide link means interconnecting said lift link means with said slideable support link.

3. The combination as set forth in claim 1 wherein a spring means is interconnected between said chassis and said mower unit for biasing said mower unit upwardly.

4. The combination as set forth in claim 1 wherein said mower unit is provided with detachable ramp means, whereby said tractor may be driven up over said mower unit, thereby positioning said mower unit for attachment.

5. A mowing device attachable to a tractor, comprising: a housing; blade means operatively disposed within said housing; mounting means affixed to said housing for attachment to said tractor; and ramp means operable with said housing, whereby said tractor may be driven up said ramp means and over said mower unit, thereby positioning said mower unit for attachment to said tractor.

6. A mowing device as recited in claim 4 wherein said ramp means is comprised of detachable slat members that extend generally from the top edges of said housing to the ground.

7. In a self propelled tractor comprising:
a maneuverable chassis adapted for travel over the ground;
a rotary mower unit attachable to said chassis and including
  a front ground engaging roller extending forwardly from said mower unit and normally spaced slightly above the ground and a rear ground engaging roller disposed about the rear of said mower unit and normally engaged with the ground;
front and rear mower mounting means fixed to said mower unit;
a cross bar pivotally secured transversely of said chassis near the front thereof;
a pair of elongated, irregularly shaped, laterally spaced apart draft links fixed about the front ends thereof to opposite ends of said cross bar and pviotally secured about the rear ends thereof to said rear mower mounting means, the irregular shape giving rise to a curvature portion that is selectively curved up and over the front of said mower unit;
a rockshaft transversely journalled to said chassis;
a pair of lift arms fixed to opposite ends of said rockshaft for rotation therewith and having oval shaped openings within the lower ends thereof;
a pair of U-shaped intermediate links connectively linking said lift arms with said rear mower mounting means, said U links including an upper leg and a lower leg both inwardly disposed, said lower leg being pivotally secured within said rear mower mounting means and moveable laterally back and forth therein for detachably connecting said upper legs within the oval shaped openings of said lift arms;
a pair of inverted vee links each having an open end pivotally secured to said front mower mounting means and a vertex encompassing the curvature portion of each of said draft links for movement therealong; and
a pair of guiding links pivotally secured at one end to the vertex of said vee links and pivotally disposed at the other end about the upper legs of said U-links, whereby said guiding links respond to the movement of said rear ground engaging roller over the ground by driving said vee links back and forth along the curvature of said draft links, said curvature being selectively curved to maintain the mower unit in a plane approximately parallel to said chassis and wherein said guiding links and said vee links are free to move vertically as said front ground engaging roller moves over sharp appreciable rises in the ground without affecting the position of the rear ground engaging roller with respect to the ground.

8. The combination as set forth in claim 7 wherein biasing means is interconnected between said mower unit and said chassis for biasing said mower unit upwardly.

9. The combination as set forth in claim 7 wherein said mower unit includes ramp means, whereby said mower unit may be properly positioned for attachment to the tractor by driving said tractor up said ramp means and over said mower unit.

10. The combination as set forth in claim 9 wherein said ramp means is comprised of elongated slat members detachably secured to said mower unit.

11. A quick attaching mower unit adapted to be positioned beneath the belly of a tractor without a significant amount of effort and labor by an operator, comprising in combination: a mower unit having a housing structure, rotary blade means disposed within said housing structure, means for coupling said housing structure to the belly of said tractor, a pair of generally elongated ramps, and means for detachably securing each ramp to said mower housing such that said tractor may be driven over said ramps and said mower housing to position said mower unit beneath the belly of said tractor.

12. A quick attaching mower unit, as recited in claim 11, wherein said means for detachably securing said elongated ramps to said mower housing comprises receiving means formed within said housing and attaching means associated with each ramp and adapted to be received by said receiving means.

13. A quick attaching mower unit, as recited in claim 12, wherein said receiving means are laterally spaced a distance approximately equal to the space between a pair of front wheels rotatively mounted in spaced apart relationship about a front portion of said tractor.

14. A quick attaching mower unit, as recited in claim 12, wherein said ramps are angled intermediately between respective ends.

* * * * *